United States Patent [19]

Wicks et al.

[11] Patent Number: 5,597,930

[45] Date of Patent: Jan. 28, 1997

[54] ASPARTATE-FUNCTIONAL POLYHYDANTOIN PREPOLYMERS AND THEIR USE IN COATING COMPOSITIONS

[75] Inventors: Douglas A. Wicks, Mt. Lebanon; Lyuba K. Gindin; Philip E. Yeske, both of Pittsburgh; E. Haakan Jonsson, Coraopolis, all of Pa.

[73] Assignee: Bayer Corporation, Pittsburgh, Pa.

[21] Appl. No.: 443,504

[22] Filed: May 18, 1995

[51] Int. Cl.⁶ .................. C07D 233/54; C08G 33/02; C08G 18/32; C08G 18/38
[52] U.S. Cl. .................. 548/314.1; 525/131; 528/68; 560/34; 560/160
[58] Field of Search .................. 548/314.1; 525/131; 528/68; 560/34, 160

[56] References Cited

U.S. PATENT DOCUMENTS

| | | | |
|---|---|---|---|
| 3,549,599 | 12/1970 | Merten | 260/77.5 |
| 3,639,418 | 2/1972 | Merten | 260/309.5 |
| 3,939,122 | 2/1976 | Merten et al. | 548/314.1 X |
| 4,260,729 | 4/1981 | Schmidt et al. | 528/68 |
| 4,496,676 | 1/1985 | Dexter et al. | 524/99 |
| 5,126,710 | 6/1992 | Zwiener et al. | 427/385.5 |

FOREIGN PATENT DOCUMENTS 2158945  5/1973  Germany .................. 427/385.5

Primary Examiner—Floyd D. Higel

Attorney, Agent, or Firm—Joseph C. Gil; Thomas W. Roy

[57] ABSTRACT

The present invention relates to aspartate-functional hydantoin prepolymers prepared by reacting a polyisocyanate having a functionality of at least 1.8 with a polyaspartate corresponding to the formula

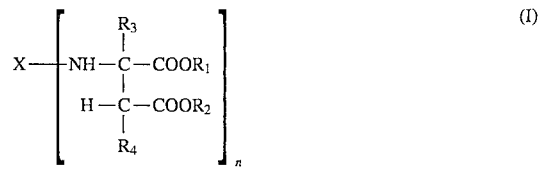

wherein X represents an organic group which has a valency of n and is inert towards isocyanate groups at a temperature of 100° C. or less, and $R_1$ and $R_2$ may be the same or different and represent optionally substituted hydrocarbon radicals, $R_3$ and $R_4$ may be identical or different and represent hydrogen or organic groups which are inert towards isocyanate groups at a temperature of 100° C. or less and n has a value of 2 to 6, preferably 2 to 4 and more preferably 2.

The present invention is also directed to compositions suitable for the production of coatings, adhesives, elastomers, potting compounds or composite matrices containing these polyhydantoin prepolymers in combination with optionally blocked polyisocyanates.

20 Claims, No Drawings

ASPARTATE-FUNCTIONAL POLYHYDANTOIN PREPOLYMERS AND THEIR USE IN COATING COMPOSITIONS

BACKGROUND OF THE INVENTION

1. Field of the Invention

This present invention relates to aspartate-functional polyhydantoin prepolymers and their use in combination with optionally blocked polyisocyanates for the production of polyureas, especially as binders in coating compositions.

2. Description of the Prior Art

Coating compositions, containing, as binders, optionally blocked polyisocyanates in combination with polyether, polyester or polycarbonate polyols are known. In addition to the preparation of coatings, these compositions may also be used for the production of elastomers, potting compounds, composite matrices and in other related applications. One of the deficiencies of using these known polyols is that they do not possess sufficient thermal, chemical and hydrolytic stability.

Accordingly, it is an object of the present invention to provide improved co-reactants for optionally blocked polyisocyanates.

This object may be achieved with the aspartate-functional hydantoin prepolymers according to the present invention.

The reaction of polyaspartates with polyisocyanates to form coatings is disclosed in U.S. Pat. No. 5,126,170. The polyisocyanates are blended with polyaspartates and then reacted after the mixture has been applied to a suitable substrate to form a urea group-containing coating. The coating is cured at low temperatures so that conversion of the urea groups to hydantoin groups does not take place.

In German Offenlegungsschrift 2,158,945 polyisocyanates are reacted with β-aminocarboxylic acid derivatives (which broadly encompass aspartates, see Example 7) to form open chain urea derivatives, which may subsequently be heated to form 6-membered 2,4-dioxohexahydro-pyrimidine derivatives.

U.S. Pat. No. 3,639,418 is directed to the reaction of bis-aspartates with monoisocyanates to form a urea intermediate which is then converted into the corresponding hydantoin by heating at elevated temperatures.

U.S. Pat. No. 3,549,599 is directed to carboxylic acid ester substituted polyhydantoins prepared by reacting stoichiometric amounts of polyaspartates with polyisocyanates and subsequently converting the urea groups to hydantoin groups. Unless chain terminating monoaspartates are used during their production, the resulting products are high molecular polymers, which may be crosslinked through the ester group remaining after hydantoin formation by transesterification or aminolysis reactions. In addition, this reference is primarily directed to the use of aromatic polyisocyanates to prepare the polyhydantoins. It can be shown that such polyhydantoins are inferior to the corresponding polyhydantoins prepared from (cyclo)aliphatic polyisocyanates with regard to the viscosity and color of the polyhydantoins and the flexibility, color and weathering of the resulting products.

None of the preceding references suggests the preparation of the aspartate-functional polyhydantoin prepolymers according to the present invention or their use as co-reactants for optionally blocked polyisocyanates.

SUMMARY OF THE INVENTION

The present invention relates to aspartate-functional hydantoin prepolymers prepared by reacting a polyisocyanate having a functionality of at least 1.8 with a polyaspartate corresponding to the formula

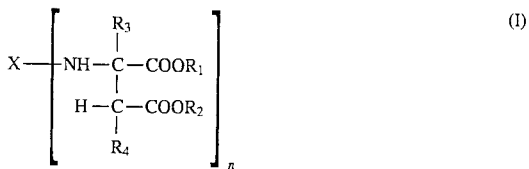

wherein
X represents an organic group which has a valency of n and is inert towards isocyanate groups at a temperature of 100° C. or less, and
$R_1$ and $R_2$ may be the same or different and represent optionally substituted hydrocarbon radicals,
$R_3$ and $R_4$ may be identical or different and represent hydrogen or organic groups which are inert towards isocyanate groups at a temperature of 100° C. or less and
n has a value of 2 to 6, preferably 2 to 4 and more preferably 2.

The present invention is also directed to compositions suitable for the production of coatings, adhesives, elastomers, potting compounds or composite matrices containing these polyhydantoin prepolymers in combination with optionally blocked polyisocyanates.

DETAILED DESCRIPTION OF THE INVENTION

The aspartate-functional polyhydantoin prepolymers according to the invention are prepared by reacting a polyisocyanate with a polyaspartate. The polyisocyanates have a functionality of 1.8 to 6, preferably 2 to 6, more preferably 2 to 4 and most preferably 2. Suitable polyisocyanate starting materials include monomeric diisocyanates and polyisocyanate adducts, preferably monomeric diisocyanates.

Suitable monomeric diisocyanates may be represented by the formula

in which R represents an organic group obtained by removing the isocyanate groups from an organic diisocyanate having a molecular weight of about 112 to 1,000, preferably about 140 to 400. Diisocyanates preferred for the process according to the invention are those represented by the above formula in which R represents a divalent aliphatic hydrocarbon group having 4 to 18 carbon atoms, a divalent cycloaliphatic hydrocarbon group having 5 to 15 carbon atoms, a divalent araliphatic hydrocarbon group having 7 to 15 carbon atoms or a divalent aromatic hydrocarbon group having 6 to 15 carbon atoms.

Examples of the suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanatocyclohexyl)-methane, 2,4'-dicyclohexyl-methane diisocyanate, 1,3-and 1,4-bis-(isocyanatomethyl)-cyclohexane, bis-(4-isocyanato-3-methyl-cyclohexyl)-methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate, 1,3- and/or 1,4-phenylene diisocyanate, 2,4- and/or 2,6-toluylene diisocyanate, 2,4- and/or 4,4'-diphenyl-methane diisocyanate, 1,5-diisocyanato naphthalene and mixtures thereof. Polyisocyanates containing 3 or more isocyanate groups such as 4-isocyanantomethyl-1,8-octamethylene diisocyanate and aromatic polyisocyanates such as 4,4',4"-triphenylmethane diisocyanate and polyphenyl polymethylene polyisocyanates obtained by phosgenating aniline/formaldehyde condensates may also be used.

Preferred organic diisocyanates include 1,6-hexamethylene diisocyanate, 1-isocyanato-3-isocyanatomethyl-3,5,5-trimethylcyclohexane (isophorone diisocyanate or IPDI), bis-(4-isocyanato-cyclohexyl)-methane, α,α,α',α'-tetramethyl-1,3- and/or -1,4-xylylene diisocyanate, 1-isocyanato-1-methyl-4(3)-isocyanatom ethyl cyclohexane, 2,4- and/or 2,6-hexahydrotoluylene diisocyanate, 2,4- and/or 2,6-toluylene diisocyanate, and 2,4- and/or 4,4'-diphenyl-methane diisocyanate.

In accordance with the present invention the polyisocyanate component may also be in the form of a polyisocyanate adduct. Suitable polyisocyanate adducts are those containing isocyanurate, uretdione, biuret, urethane, allophanate, carbodiimide and/or oxadiazine-trione groups. The polyisocyanates adducts have an average functionality of 2 to 6 and an NCO content of 5 to 30% by weight.

1) Isocyanurate group-containing polyisocyanates which may be prepared as set forth in DE-PS 2,616,416, EP-OS 3,765, EP-OS 10,589, EP-OS 47,452, U.S. Pat. No. 4,288,586 and U.S. Pat. No. 4,324,879. The isocyanato-isocyanurates generally have an average NCO functionality of 3 to 3.5 and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a suitable catalyst, e.g., a trialkyl phosphine catalyst, and which may be used in admixture with other aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906,126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as trimethylol propane, glycerine, 1,2-dihydroxy propane and mixtures thereof. The urethane group-containing polyisocyanates have a most preferred NCO content of 12 to 20% by weight and an (average) NCO functionality of 2.5 to 3.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 21% by weight and an (average) NCO functionality of 2 to 4.5.

6) Isocyanurate and allophanate group-containing polyisocyanates which may be prepared in accordance with the processes set forth in U.S. Pat. Nos. 5,124,427, 5,208,334 and 5,235,018, the disclosures of which are herein incorporated by reference, preferably polyisocyanates containing these groups in a ratio of monoisocyanurate groups to monoallophanate groups of about 10:1 to 1:10, preferably about 5:1 to 1:7.

7) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

8) Polyisocyanates containing oxadiazinetrione groups and containing the reaction product of two moles of a diisocyanate and one mole of carbon dioxide.

Preferred polyisocyanate adducts are the polyisocyanates containing isocyanurate groups, biuret groups and mixtures of isocyanurate groups with either allophanate or uretdione groups.

Suitable polyaspartates that may be used as starting materials for the production of the aspartate-functional polyhydantoin prepolymers according to the invention include those corresponding to the formula:

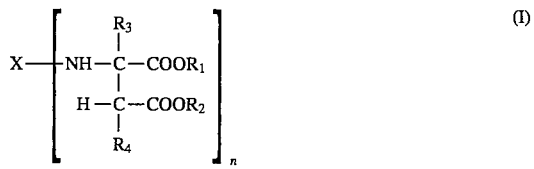

wherein

X represents an organic group which has a valency of n and is inert towards isocyanate groups at a temperature of 100° C. or less, preferably a hydrocarbon group obtained by removing the amino groups from an aliphatic, araliphatic or cycloaliphatic polyamine, more preferably a diamine, and $R_1$ and $R_2$ may be the same or different and represent optionally substituted hydrocarbon radicals, preferably an alkyl group containing 1 to 9 carbons and more preferably methyl, ethyl or butyl groups, $R_3$ and $R_4$ may be identical or different and represent hydrogen or organic groups which are inert towards isocyanate groups at a temperature of 100° C. or less, preferably hydrogen, and n has a value of at least 2, preferably 2 to 6, more preferably 2 to 4 and most preferably 2.

These polyaspartates may be prepared by reacting optionally substituted maleic or fumaric acid esters with polyamines. Suitable optionally substituted maleic or fumaric acid esters are those corresponding to the formula $$R_1OOC—CR_3=CR_4—COOR_2 \tag{II}$$

wherein $R_1$, $R_2$, $R_3$ and $R_4$ are as defined above.

Examples of optionally substituted maleic or fumaric acid esters suitable for use in the preparation of the polyaspartates include dimethyl, diethyl and dibutyl (e.g., di-n-butyl) esters of maleic acid and fumaric acid and the corresponding maleic or fumaric acid esters substituted by methyl in the 2- and/or 3-position.

Suitable polyamines for preparing the polyaspartates include those corresponding to the formula $$X—(—NH_2)_n$$

wherein X and n are as previously defined.

The polyamines include high molecular weight amines having molecular weights of 800 to about 10,000, preferably 800 to about 6,000, and low molecular weight amines having molecular weights below 800, preferably below 600.

The molecular weights are number average molecular weights ($M_n$) and are determined by end group analysis (NH number). Examples of these polyamines are those wherein the amino groups are attached to aliphatic, cycloaliphatic, araliphatic and/or aromatic carbon atoms.

Suitable low molecular polyamines include ethylene diamine, 1,2- and 1,3-propane diamine, 2-methyl-1,2-propane diamine, 2,2-dimethyl-1,3-propane diamine, 1,3- and 1,4-butane diamine, 1,3- and 1,5-pentane diamine, 2-methyl-1,5-pentane diamine, 1,6-hexane diamine, 2,5-dimethyl-2,5-hexane diamine, 2,2,4-and/or 2,4,4-trimethyl-1,6-hexane diamine, 1,7-heptane diamine, 1,8-octane diamine, 1,9-nonane diamine, triaminononane, 1,10-decane diamine, 1,11-undecane diamine, 1,12-dodecane diamine, 1-amino-3-aminomethyl-3,5,5-trimethyl cyclohexane, 2,4- and/or 2,6-hexahydrotoluylene diamine, 2,4'- and/or 4,4'-diaminodicyclohexylmethane, 3,3'-dialkyl-4,4'-diamino-dicyclohexyl methanes (such as 3,3'-dimethyl-4,4'-diamino-dicyclohexyl methane and 3,3'-diethyl-4,4'-diamino-dicyclohexyl methane), 1,3- and/or 1,4-cyclohexane diamine, 1,3-bis(methylamino)-cyclohexane, 1,8-p-menthane diamine, hydrazine, hydrazides of semicarbazido carboxylic acids, bis-hydrazides, bis-semicarbazides, phenylene diamine, 2,4- and 2,6-toluylene diamine, 2,3- and 3,4-toluylene diamine, 2,4'- and/or 4,4'-diaminodiphenyl methane, higher functional polyphenylene polymethylene polyamines obtained by the aniline/formaldehyde condensation reaction, N,N,N-tris-(2-amino-ethyl)-amine, guanidine, melamine, N-(2-aminoethyl)-1,3-propane diamine, 3,3'-diamino-benzidine, polyoxypropylene amines, polyoxyethylene amines, 2,4-bis-(4'-aminobenzyl)-aniline and mixtures thereof. Also suitable are amine-terminated polyethers having the required molecular weight such as the Jeffamine resins, e.g., Jeffamine D-230 and T-403, available from Huntsman.

Suitable high molecular weight polyamines include those prepared from the known polyhydroxyl compounds of polyurethane, especially the polyethers. The polyamines may be prepared by reacting the polyhydroxyl compounds with an excess of the previously described polyisocyanates to form NCO prepolymers and subsequently hydrolyzing the terminal isocyanate group to an amino group. Preferably, the polyamines are prepared by converting the terminal hydroxy groups of the polyhydroxyl compounds to amino groups, e.g., by amination. Preferred high molecular weight polyamines are amine-terminated polyethers such as the Jeffamine resins available from Huntsman.

Preferred polyamines are 1-amino-3-aminomethyl-3,5,5-trimethylcyclohexane (isophorone diamine or IPDA), bis-(4-aminocyclo-hexyl)-methane, bis-(4-amino-3-methylcyclohexyl)-methane, 1,6-diamino-hexane, 2-methyl pentamethylene diamine, ethylene diamine, triaminononane, 2,4- and/or 2,6-toluylene diamine, 4,4'- and/or 2,4'-diaminodiphenyl methane and the Jeffamine D-230 and T-403 resins.

The preparation of the polyaspartates from the above mentioned starting materials may be carried out, for example, at a temperature of 0° to 100° C. using the starting materials in such proportions that at least 1, preferably 1, olefinic double bond is present for each primary amino group. Excess starting materials may be removed by distillation after the reaction. The reaction may be carried out solvent-free or in the presence of suitable solvents such as methanol, ethanol, propanol, dioxane and mixtures of such solvents.

The aspartate-functional polyhydantoin prepolymers according to the invention are prepared by reacting the polyisocyanates with the polyaspartates at an equivalent ratio of aspartate groups (i.e., secondary amino groups) to isocyanate groups of 1.05:1 to 10:1, preferably 1.1:1 to 10:1 and more preferably 1.2:1 to 10:1. The reaction is preferably carried out by incrementally adding the polyisocyanate to the polyaspartate. The reaction to form the urea group-containing intermediate is conducted at a temperature of 10° to 100° C., preferably 20° to 80° C. and more preferably 20° to 50° C. After this addition reaction is complete the temperature is increased to 60° to 240° C., preferably 80° to 160° C. and more preferably 100° to 140° C., to convert the urea groups to hydantoin groups with the elimination of a monoalcohol. Instead of forming the urea groups and hydantoin groups in two steps, the reaction may be carried out entirely at elevated temperatures in order to form the urea groups and hydantoin groups in one step.

When using polyisocyanates and polyaspartates having functionalities of 2, the aspartate-functional polyhydantoin prepolymers may be represented by the formula

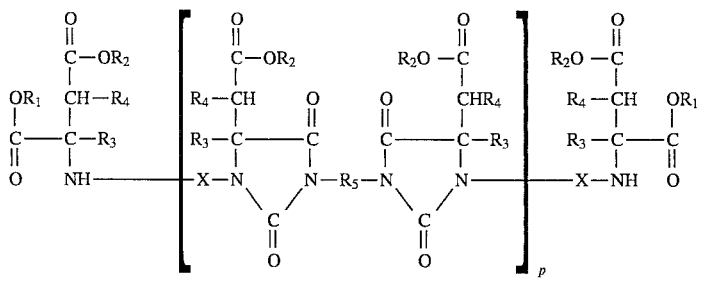

wherein

X, $R_1$, $R_2$, $R_3$ and $R_4$ are as previously defined, $R_5$ represents the residue obtained by removing the isocyanate groups from an organic diisocyanate, preferably an organic monomeric diisocyanate and p has a value of 1 to 20, preferably 1 to 10 and more preferably 1 to 5.

The aspartate-functional polyhydantoin prepolymers may be used in combination with the previously described monomeric diisocyanates or preferably polyisocyanate adducts to form two-component coating compositions. They may also be reacted with NCO prepolymers, which are prepared from the previously described monomeric polyisocyanates or polyisocyanate adducts, preferably monomeric diisocyanates, and organic compounds containing at least two isocyanate-reactive groups, preferably at least two hydroxy groups. These organic compounds include high molecular weight compounds having molecular weights of 400 to about 6,000, preferably 800 to about 3,000, and optionally low molecular weight compounds with molecular weights below 400. The molecular weights are number average molecular weights ($M_n$) and are determined by end group analysis (OH number).

Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred. Further details concerning the low molecular weight compounds and the starting materials and methods for preparing the high molecular weight polyhydroxy compounds are disclosed in U.S. Pat. No. 4,701,480, herein incorporated by reference. The NCO prepolymers generally have an isocyanate content of about 0.5 to 30% by weight, preferably about 1 to 20% by weight, and are prepared in known manner by the reaction of the above mentioned starting materials at an NCO/OH equivalent ratio of about 1.05:1 to 10:1 preferably about 1.1:1 to 3:1.

The aspartate-functional polyhydantoin prepolymers may be also be used in combination with blocked polyisocyanates to form one-component compositions, which are cured at elevated temperatures. In these applications it is not necessary to convert the urea groups to hydantoin groups prior to combining these resins with the blocked polyisocyanates. This is because these compositions must be cured at elevated temperatures and while the resins are heated to the curing temperature, the urea groups can be converted to hydantoin groups.

Suitable blocked polyisocyanates are prepared by blocking the previously described monomeric diisocyanates, polyisocyanate adducts or NCO prepolymers with a monofunctional blocking agent for isocyanate groups. Suitable blocking agents are known and include monophenols; primary, secondary or tertiary alcohols; compounds which easily form enols such as acetoacetic ester, acetyl acetone and malonic acid derivatives; secondary aromatic amines; imides; lactams; oximes; mercaptans; and triazoles.

The aspartate-functional polyhydantoin prepolymers are mixed with the preceding co-reactants in amounts sufficient to provide an equivalent ratio of secondary amino groups to isocyanate groups of 3:1 to 1:3, preferably 2:1 to 1:2 and more preferably 1.1:1.0 to 1.0:1.1. The resulting products prepared from the hydantoin prepolymers according to the invention possess improved hydrolytic, chemical and thermal stability when compared to known ester, carbonates and ethers, which are commonly used as co-reactants for polyisocyanates.

Compositions containing the polyhydantoin prepolymers according to the invention are suitable for various applications such as binder components for the production of coatings, adhesives, foams, elastomers, potting compounds, composite matrices and microcellular elastomers. The compositions may also contain other known additives such as catalysts, pigments, fillers, levelling agents, antisettling agents, UV stabilizers and the like.

In a preferred embodiment the compositions are used for the production of coatings by one or more layers to substrates by known methods such as spraying, brush coating, immersion or flooding or by means of rollers or doctor applicators. These coating compositions are suitable for the formation of coatings on various substrates. e.g., metals, plastics, wood, cement, concrete or glass. The coating compositions are particularly suitable for the formation of coatings on sheet steel, for example, for the manufacture of car bodies, machine trim panels, vats or containers. The substrates to be coated by the process according to the invention may be treated with suitable primers before the process according to the invention is carried out.

After the substrates have been coated, the two-component compositions may be cured at either ambient temperature, e.g., by air drying or so-called forced drying, or at elevated temperature. The one-component compositions must be cured at elevated temperatures. It is of great benefit that the coatings will not thermally degrade even at the higher temperatures which may occur in the event of a breakdown of the coatings plant.

The invention is further illustrated but is not intended to be limited by the following examples in which all parts and percentages are by weight unless otherwise specified.

EXAMPLES

The following starting materials were used in the examples:

Bis-aspartate 1

210 parts of 4,4'-diamino-dicyclohexylmethane (1.0 mole) were added dropwise with stirring to 344 parts of maleic acid diethylester (2.0 moles) that were previously charged at ambient temperature to a 1 L three necked flask equipped with a stirrer, thermometer and an addition funnel. The amine was added at a rate such that the exotherm did not increase the temperature of the reaction mixture above 50° C. Upon complete addition the contents of the reaction flask were maintained at 50° C. for a period of 12 hours. The resulting product was a clear, colorless liquid having a viscosity of about 1400 mPa·s (25° C.) and an amine equivalent weight of about 276.

Bis-aspartate 2

116 parts of 2-methyl-1,5-pentanediamine (1.0 mole) were added dropwise with stirring to 344 parts of maleic acid diethylester (2.0 moles) that were previously charged at ambient temperature to a 1 L three necked flask equipped with a stirrer, thermometer and an addition funnel. The amine was added at a rate such that the exotherm did not increase the temperature of the reaction mixture above 50° C. Upon complete addition the contents of the reaction flask were maintained at 50° C. for a period of 12 hours. The resulting product was a clear, colorless liquid having a viscosity of about 90 mPa·s (25° C.) and an amine equivalent weight of about 230.

Bis-aspartate 3

170 parts of isophorone diamine (1.0 mole) were added dropwise with stirring to 344 parts of maleic acid diethylester (2.0 moles) that were previously charged at ambient temperature to a 1 L three necked flask equipped with a stirrer, thermometer and an addition funnel. The amine was added at a rate such that the exotherm did not increase the temperature of the reaction mixture above 50° C. Upon complete addition the contents of the reaction flask were maintained at 50° C. for a period of 12 hours. The resulting product was a clear, colorless liquid having a viscosity of about 500 mPa·s (25° C.) and an amine equivalent weight of about 230.

Bis-aspartate 4

116 parts of 2-methyl-1,5-pentanediamine (1.0 mole) were added dropwise with stirring to 456 parts of maleic acid dibutylester (2.0 moles) that were previously charged at ambient temperature to a 1 L three necked flask equipped with a stirrer, thermometer and an addition funnel. The amine was added at a rate such that the exotherm did not increase the temperature of the reaction mixture above 50° C. Upon complete addition the contents of the reaction flask were maintained at 50° C. for a period of 12 hours. The resulting product was a clear, colorless liquid having a viscosity of about 64 mPa·s (25° C.) and an amine equivalent weight of about 286.

Examples 1–6

Preparation of aspartate-functional polyhydantoin prepolymers

The bis-aspartate was charged into a flask under a nitrogen atmosphere and then 1,6-hexamethylene diisocyanate (HDI) was added dropwise to the bis-aspartate with the temperature being maintained below 80° C. The reaction mixture was then heated under vacuum to 120° C. until the evolution of alcohol stopped, which indicated the completion of hydantoin formation. The following table sets forth the amounts of the reactants and the properties of the resulting aspartate-functional polyhydantoin prepolymers.

| Example | 1 | 2 | 3 | 4 | 5 | 6 |
|---|---|---|---|---|---|---|
| Isocyanate | HDI | HDI | HDI | HDI | HDI | HDI |
| Amount | 54.04 | 32.92 | 14.09 | 17.62 | 12.03 | 9.13 |
| Bis-aspartate | 2 | 1 | 3 | 1 | 1 | 1 |
| amount | 295.96 | 217.08 | 85.91 | 232.38 | 237.97 | 240.87 |
| NH/NCO | 2:1 | 2:1 | 2:1 | 2:1 | 4:1 | 8:1 |
| Viscosity[1] | 39,910 | >328,000 | Solid | 78,440 | 15,730 | 8,429 |
| Amine Number | 113.6 | — | 99.0 | — | — | — |

[1]Solution viscosity determined in butyl acetate. All viscosity measured using Brookfield DV-II+ viscometer equipped with a CP-52 spindle at 25° C.

Examples 7–9

Preparation of aspartate-functional polyhydantoin prepolymers

The bis-aspartate was charged into a flask under a nitrogen atmosphere and then 1,6-hexamethylene diisocyanate (HDI) was added dropwise to the bis-aspartate with the temperature being maintained below 80° C. The reaction mixture was then heated under vacuum to 120° C. until the evolution of alcohol stopped, which indicated the completion of hydantoin formation. The following table sets forth the amounts of the reactants and the properties of the resulting aspartate-functional polyhydantoin prepolymers.

| Example | 7 | 8 | 9 |
|---|---|---|---|
| Isocyanate | HDI | HDI | HDI |
| Amount | 13.15 | 24.68 | 31.60 |
| Bis-aspartate | 4 | 4 | 4 |
| amount | 186.5 | 175.32 | 168.40 |
| NH/NCO | 4:1 | 2:1 | 1.5:1 |
| Viscosity[1] | 4950 | 7700 | 89,450 |
| Amine Number | 138 | 93 | 64 |

[1]Solution viscosity determined in butyl acetate. All viscosity measured using Brookfield DV-II+ viscometer equipped with a CP-52 spindle at 25° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aspartate-functional hydantoin prepolymer prepared by reacting, at an equivalent ratio of aspartate groups to isocyanate groups of 1.05:1 to 10:1, a polyisocyanate having a functionality of at least 1.8 with a polyaspartate corresponding to the formula

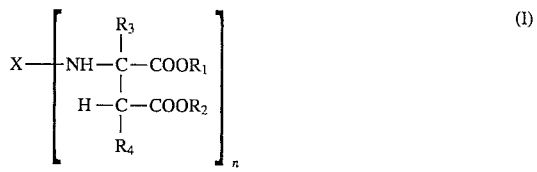

wherein

X represents an organic group which has a valency of n and is inert towards isocyanate groups at a temperature of 100° C. or less, and $R_1$ and $R_2$ may be the same or different and represent unsubstituted or substituted hydrocarbon radicals, $R_3$ and $R_4$ may be identical or different and represent hydrogen or organic groups which are inert towards isocyanate groups at a temperature of 100° C. or less and n has a value of 2 to 6.

2. The hydantoin prepolymer of claim 1 wherein $R_1$ and $R_2$ represent a methyl, ethyl or butyl group and $R_3$ and $R_4$ represent hydrogen.

3. The hydantoin prepolymer of claim 1 wherein n is 2.

4. The hydantoin prepolymer of claim 2 wherein n is 2.

5. An aspartate-functional hydantoin prepolymer corresponding to the formula

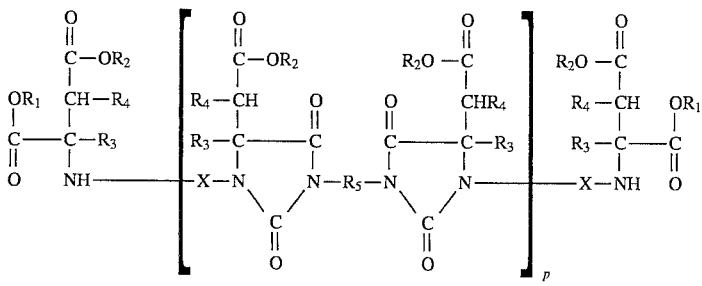

wherein

X represents an organic group which has a valency of 2 and is inert towards isocyanate groups at a temperature of 100° C. or less, and R₁ and R₂ may be identical or different and represent organic groups which are inert towards isocyanate groups at a temperature of 100° C. or less, R₃ and R₄ may be identical or different and represent hydrogen or organic groups which are inert towards isocyanate groups at a temperature of 100° C. or less and R₅ represents the radical obtained by removing the isocyanate groups from an organic diisocyanate, p has a value of 1 to 20.

6. The hydantoin prepolymer of claim 5 wherein $R_1$ and $R_2$ represent a methyl, ethyl or butyl group and $R_3$ and $R_4$ represent hydrogen.

7. The hydantoin prepolymer of claim 1 wherein said prepolymer is prepared at an equivalent ratio of aspartate groups to isocyanate groups of 1.1:1 to 10:1.

8. The hydantoin prepolymer of claim 2 wherein said prepolymer is prepared at an equivalent ratio of aspartate groups to isocyanate groups of 1.1:1 to 10:1.

9. The hydantoin prepolymer of claim 3 wherein said prepolymer is prepared at an equivalent ratio of aspartate groups to isocyanate groups of 1.1:1 to 10:1.

10. The hydantoin prepolymer of claim 4 wherein said prepolymer is prepared at an equivalent ratio of aspartate groups to isocyanate groups of 1.1:1 to 10:1.

11. The hydantoin prepolymer of claim 1 wherein said prepolymer is prepared at an equivalent ratio of aspartate groups to isocyanate groups of 1.2:1 to 10:1.

12. The hydantoin prepolymer of claim 2 wherein said prepolymer is prepared at an equivalent ratio of aspartate groups to isocyanate groups of 1.2:1 to 10:1.

13. The hydantoin prepolymer of claim 3 wherein said prepolymer is prepared at an equivalent ratio of aspartate groups to isocyanate groups of 1.2:1 to 10:1.

14. The hydantoin prepolymer of claim 4 wherein said prepolymer is prepared at an equivalent ratio of aspartate groups to isocyanate groups of 1.2:1 to 10:1.

15. The hydantoin prepolymer of claim 5 wherein p has a value of 1 to 10.

16. The hydantoin prepolymer of claim 6 wherein p has a value of 1 to 10.

17. The hydantoin prepolymer of claim 5 wherein p has a value of 1 to 5.

18. The hydantoin prepolymer of claim 6 wherein p has a value of 1 to 5.

19. A two-component coating composition containing as binder a polyisocyanate and the prepolymer of claim 1.

20. A one-component coating composition containing as binder a blocked polyisocyanate and the prepolymer of claim 1.

* * * * *